Apr. 3, 1923.
A. R. CROZIER
COUPLING
Filed Apr. 16, 1920
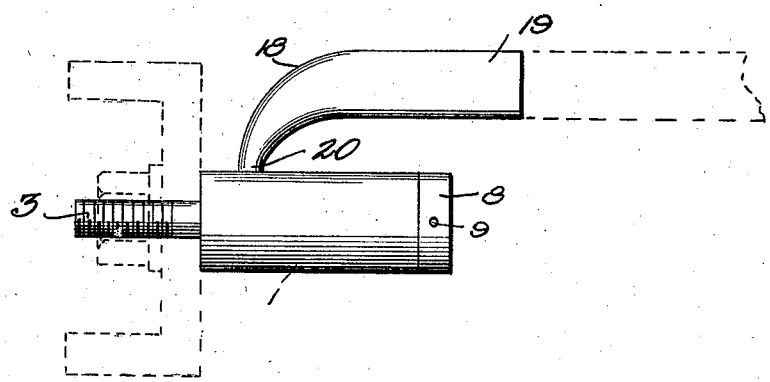
Fig. 1.
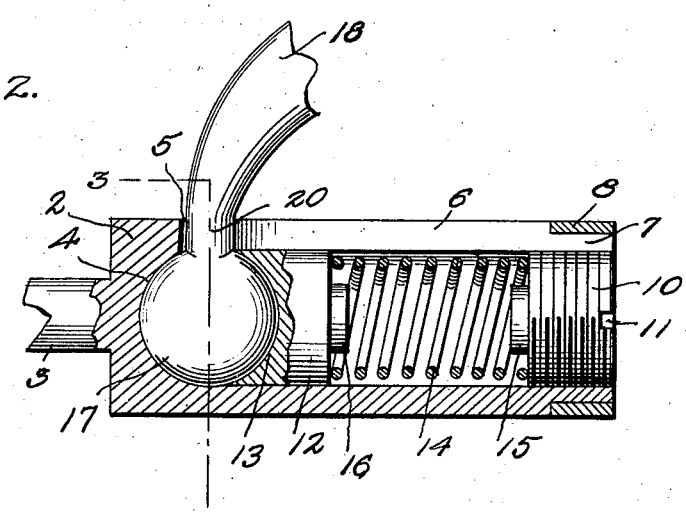
Fig. 2.
Fig. 3.
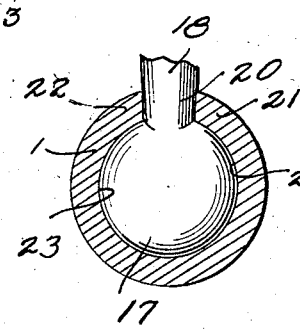
Fig. 4.
Inventor
Arthur R Crozier
Witnesses
By Richard B Owen,
Attorney Patented Apr. 3, 1923.

1,450,665

UNITED STATES PATENT OFFICE.

ARTHUR R. CROZIER, OF EL PASO, TEXAS.

COUPLING.

Application filed April 16, 1920. Serial No. 374,391.

*To all whom it may concern:*

Be it known that I, ARTHUR R. CROZIER, a citizen of the United States, residing at El Paso, in the county of El Paso and State of Texas, have invented certain new and useful Improvements in Couplings, of which the following is a specification.

The purpose of the invention is to provide an improved means of coupling trailers to automobiles or other vehicles in such a manner that the starting of the propelling vehicle may not be followed by any subsequent effect detrimental to the efficiency of the trailer or in other words to provide a flexible coupling means which will enable the tongue of the trailer to respond evenly and readily to the controlling influences of the propelling vehicle.

The invention further contemplates the provision of an improved coupler which will, in effect, act as a bumper between the trailer pole and the leading vehicle, means being provided for taking up and absorbing the shock and jars incident to the sudden starting or turning of the vehicle.

With the above and other objects in view, the invention may be considered as residing in the details of construction, combination and arrangement of parts as will be hereinafter more fully pointed out and explained, reference being had to the accompanying drawings, wherein—

Figure 1 is a side elevation of the coupler,

Figure 2 is a vertical longitudinal section therethrough,

Figure 3 is a vertical cross section taken on line 3—3 of Figure 2 and

Figure 4 is a top plan view.

Broadly stated, the invention consists of separable ball and socket members adapted to be respectively carried by the trailer and the vehicle to which it is coupled. The socket member consists of a cylindrical sleeve 1 of hollow construction and having a solid or closed end 2 provided with a forwardly projecting stem 3 by means of which the sleeve is attached to the vehicle. This stem is adapted to be inserted through an opening formed in the rear frame of an automobile or other vehicle as indicated in dotted lines structure of Figure 1, the stem being threaded as shown so that a suitable nut may be screwed thereon for clamping the sleeve firmly against the frame. The sleeve has a concaved recess 4 provided upon the inner face of its closed end to provide a seat for the spherical knob of the ball member and the wall of the sleeve above the recess is provided with a circular opening 5 and a longitudinally extending slot 6 leading from the opening out to the open end of the sleeve, both the opening and slot being in communication with the sleeve. At its open end the sleeve is reduced as indicated at 7 and upon this reduced end is adapted to be fitted a locking band 8 for a purpose to be hereinafter more fully explained, it being sufficient to here mention that this band is provided with a pair of diametrically opposed openings 9 adapted to register with corresponding openings formed in the reduced end 7 so that any suitable pin means may be employed for fastening the band securely in place. The reduced end is further provided on the inside with screw threads and is adapted to receive the threaded plug 10. The plug 10 consists of a solid cylindrical member, threaded externally and adapted to be screwed into the reduced end of the sleeve by a screw driver or other suitable implement, the end of which may be inserted in the groove or slot 11. Disposed for slidable movement within the bore of the sleeve and between the seat 4 and the plug 10 is a cylindrical block or plunger head 12 which is provided with a concaved recessed face 13 which is also adapted to provide a seat for the spherical knob of the ball member when the latter is arranged in the sleeve, the block 12 being adapted to be shoved up in proximity to the closed end 2 of the sleeve so that a suitable socket may thus be provided for receiving the knob between the concaved opposed faces 4 and 13 respectively. Spacing the plunger head 12 from the plug 10 is a coiled spring 14, one end of which is adapted to encircle the inwardly projecting lug 15 of the plug, resting snugly against the flat inner face of the latter, while the other end of the spring coils about the lug 16 projecting inwardly of the plunger head, resting against the inwardly disposed flat face of the latter. This spring as will be apparent, normally tends to keep the head 12 in proximity to the recessed end 4 of the sleeve although permitting it to slide rearwardly in the sleeve and in the direction of the plug 10, against the action of the spring when acted upon by any force overcoming the tension of the spring.

The ball member consists of a large spherical knob 17 forming the outer terminal of the curved end of a bracket arm which is adapted to be attached to the pole of a trailer. This arm is provided with a straight shank portion 19 which extends rearwardly from the curved end 18 so as to project laterally of the knob for an indefinite distance, the shank being either tubular or U-shaped in formation so as to provide a socket for the end of the tongue. The ball member is thus permanently affixed to the trailer while the sleeve member is carried by the vehicle to which the trailer is to be attached. In joining the members, the spherical knob 17 is inserted in the sleeve through the open end, after the plunger, that is the plug, head block and spring, have been removed together with the band 8 which opens the slot 6. As the spherical knob is pushed towards the recessed seat 4, the reduced neck 20 of the arm is received in the slot 6 which being slightly narrower than the diameter of the neck is widened by the expansion of the side walls 21 and 22 respectively, the latter naturally being forced slightly apart as the neck is forced towards the circular opening 5, and then contracting after the spherical knob is seated in the recess 4 with its neck portion in the opening 5. During this assembling of the two members, the shank 19 may be gripped and used as a handle for pulling the knob into place. The locking band 8 may then be forced upon the reduced end 7 to close the open end of the channel and to hold the side walls 21 and 22 together for narrowing the slot and confining the neck 20 of the arm within the opening 5. The block 12 is inserted in the sleeve and is held against the knob 17 by the spring 14, one end of which bears against the lug 10 when the latter is screwed in place. The pressure of the spring against the head may be regulated by the plug which may be screwed inwardly to increase the tension of the spring and thus force the head tightly against the knob or it may be only screwed in a sufficient extent to permit the knob to turn easily within its socket as the pole of the trailer oscillates vertically or horizontally. It is to be particularly noted that the opening 5 is constructed of a larger diameter than the neck 20 of the arm to allow for movement of the latter during vertical oscillation of the trailer pole with respect to the pulling vehicle and also when suddenly stopping or starting the latter. At such times the trailer is brought to a halt, or when starting pulls, with a jerk due ordinarily to the fact that the coupler transmits the movement of the vehicle directly to the trailer without absorbing any of it, with the result that the trailer is either jarred into motion or brought to a standstill with an abrupt halt, which is detrimental to the coupler itself which is thus abruptly strained and to some extent weakened and which likewise jerks both the vehicle and the trailer. The present invention may be used in a modified and abbreviated form if desired, with the spring left out entirely and the block 12 made in one piece with the plug 10. But the presence of the spring is an essential element in enabling the coupler to absorb the shock and jars incident to the pulling of the trailer as it tends to resiliently hold the head against the knob 17 so that when the leading vehicle is suddenly started, the spring acts as a cushion between the plug 10 and the head 12, absorbing the initial shock of the starting motion. This is particularly true when a trailer happens to be so heavily loaded that the weight would ordinarily tend to hold the ball member stationary against the pull of the socket 1, in which instance the sleeve is permitted to move forwardly of the ball member at least to the extent of the space provided between the reduced neck 20 and the edge of the large opening 5, causing the spring to be contracted between the head 12 and the inwardly moving plug end 7 of the sleeve, until the tension of the contracted spring gradually overcomes the resistance of the trailer to which starting motion is thus transmitted.

As illustrated to advantage in Figure 3, the knob 17 fits snuggly within the bore of the sleeve, the inner opposing walls 23 and 24 of which fit around the knob as shown and to uncouple the trailer it is only necessary to unscrew the plug 10 from the sleeve, removing the plunger spring and head block together with the locking band 8. Upon the backing of the trailer away from the vehicle, or vice versa, the ball member will be drawn towards the open end of the sleeve, with the knob end sliding easily between the walls of the sleeve and the reduced neck of the arm passing out through the slot 6 until the member is entirely uncoupled from the sleeve.

Having thus described my invention, what I claim as new and desire to secure by Letters Patent is:—

In a device of the kind described, a tubular member having one end closed and reduced to form a stem, said stem being threaded to provide nut receiving means, the opposite end of said member being open, threaded interiorly and reduced exteriorly, a plug adapted to be received within the open interiorly threaded end of said member, said member having a slot extending from the open end and terminating adjacent the closed end, a retaining ring on the reduced open end of said member for closing the slot at its open end and having an outside diameter equal to the body of said member, a plunger slidable in said member, a compression spring between said plunger and plug, a ball head engaged by said plunger, and a bracket arm extending from the ball upwardly through the slot.

In testimony whereof I affix my signature in presence of two witnesses.

ARTHUR R. CROZIER.

Witnesses:
  JOE DUNNE,
  JOS. J. MURPHY.